US008684611B2

(12) United States Patent
Childers et al.

(10) Patent No.: US 8,684,611 B2
(45) Date of Patent: Apr. 1, 2014

(54) TWO-PIECE SPRING PUSH FOR FIBER OPTIC CONNECTORS WITH LARGE DIAMETER FIBER OPTIC CABLES

(75) Inventors: Darrell R. Childers, Hickory, NC (US); Mike Hughes, Hickory, NC (US); Hiep Nguyen, Fort Hill, SC (US)

(73) Assignee: US Conec, Ltd., Hickory, NC (US)

( * ) Notice: Subject to any disclaimer, the term of this patent is extended or adjusted under 35 U.S.C. 154(b) by 201 days.

(21) Appl. No.: 13/401,385

(22) Filed: Feb. 21, 2012

(65) Prior Publication Data

US 2012/0213484 A1 Aug. 23, 2012

Related U.S. Application Data

(60) Provisional application No. 61/445,391, filed on Feb. 22, 2011.

(51) Int. Cl.
*G02B 6/36* (2006.01)

(52) U.S. Cl.
USPC ........................................................ 385/78

(58) Field of Classification Search
None
See application file for complete search history.

(56) References Cited

U.S. PATENT DOCUMENTS

| | | | | |
|---|---|---|---|---|
| 4,448,478 | A * | 5/1984 | Matthews et al. | 385/59 |
| 2002/0110333 | A1* | 8/2002 | Yang | 385/78 |
| 2009/0285534 | A1* | 11/2009 | Ishikawa | 385/81 |
| 2010/0092147 | A1 | 4/2010 | Desard et al. | |
| 2013/0142489 | A1* | 6/2013 | Isenhour et al. | 385/79 |

OTHER PUBLICATIONS

US Conec, Ltd., "Spring Push, Round, MTP; Drawing C8042, Rev. B," Jul. 14, 2005, US.

US Conec, Ltd., "Applications Engineering Notes, MTP Housing Assembly Procedure for Cabled Multifiber Optical Ribbon, Doc. No. AEN-1402;" Sep. 2001, pp. 1-5.

* cited by examiner

*Primary Examiner* — Sung Pak
(74) *Attorney, Agent, or Firm* — Michael L. Leetzow, P.A.

(57) ABSTRACT

A two-piece spring push includes a main body portion and a cap. The cap is attached to the main body portion through frictional or interference fits of projections and openings in the two-piece spring push. The two-piece spring push allows for the use of the spring push on larger diameter optical cables as the spring push is assembled on the optical fibers after the optical fibers are terminated in an optical ferrule.

18 Claims, 6 Drawing Sheets

104 100 160 172 182 190 170 162 168 174 112 132 142 140 116 118 152 140 106 112 300 130 118 114 120 150 110 102 108

TWO-PIECE SPRING PUSH FOR FIBER OPTIC CONNECTORS WITH LARGE DIAMETER FIBER OPTIC CABLES

REFERENCE TO RELATED CASE

This application claims priority under 35 U.S.C. §119 (e) to provisional application Ser. No. 61/445,391, filed on Feb. 22, 2011, which is hereby incorporated by reference in its entirety.

BACKGROUND OF THE INVENTION

Field of the Invention

The use of large outer diameter fiber optic cables with MT ferrules poses a problem with the standard components used to terminate those ferrules. One of those components is the spring push. In some fiber optic connectors, including those that use the MT ferrules, a spring push is used to bias a spring against the back end of the ferrule or a pin clamp. The back end of the spring push is typically cylindrical in shape and is used in conjunction with a crimp band to secure the strength member of the fiber optic cable (typically aramid fibers) to the fiber optic connectors. The spring push is usually disposed over the end of the fiber optic cable prior to terminating the end of the optical fibers in the ferrule. This requires that the spring push be large enough to pass over the outer diameter of the fiber optic cable so that it will be out of the way during assembly. In its final position, however, the spring push need not be so large. Thus, the spring push could be attached after the optical fibers are attached to the optical ferrule, but that requires a two-piece component. A two-piece component must be able to be secured to the fiber optic connectors in a relatively quick manner and at the same time be robust enough to withstand the forces placed on the fiber optic connectors in the field.

A two-piece spring push, which meets all applicable standards, including FOCIS 5 and IEC-61754-7, includes projections and corresponding openings that frictionally engage one another, and in conjunction with the use of a crimp band, may be used with the larger optical fiber cables and may be applied in the field.

SUMMARY OF THE INVENTION

The present invention is directed to a two-piece spring push for use with a fiber optic connector that includes a main body, the main body having a front end, a back end, and a middle portion disposed therebetween, the front end comprising two generally parallel extensions extending from the middle portion, the back end forming at least a portion of a cylinder, and a cap configured to mate with the main body, the cap engaging at least a portion of the middle portion of the main body and at least a portion of the back end, the cap and the main body forming an opening through at least a portion of the spring push.

In some embodiments, the cap has at least two alignment features to align the cap with the main body.

In some embodiments, the cap has five projections, the five projections corresponding to five openings on the main body, each of the five projections to be frictionally disposed within a corresponding one of the five openings on the main body to hold the cap to the main body.

In another aspect, the invention is directed to a pring push for a fiber optic connector that includes a main body and a cap, the main body and cap secured to one another only by friction caused by mating the main body and cap, an opening formed by the mated main body and cap extending through at least a portion of the spring piece, and a crimp body formed by the mating of the main body and cap at a back end thereof.

In yet another aspect, the invention is directed to method of assembling a spring push on terminated optical fibers that includes the steps of providing a plurality of optical fibers terminated on an optical ferrule, providing a two-piece spring push, the two-piece spring push having a main body with a groove therein and a cap portion configured to mate with the main body and having a groove therein that corresponds to the groove in the main portion, the two grooves forming an opening therein when the main body and cap are mated with one another to allow the spring push to be moved along the plurality of optical fibers, disposing the plurality of optical fibers in the groove of the main body rearwardly of the optical fiber, aligning the cap over the plurality of optical fibers disposed in the groove of the main body, inserting at least one first projection on the cap into a corresponding first opening in the main body, and pressing the cap onto the main body such that at least one second projection engages a at least one second opening, the at least one second projection frictionally engaging the at least one second opening to retain the cap on the main body.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of the present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE PREFERRED EMBODIMENTS

Figure 1:
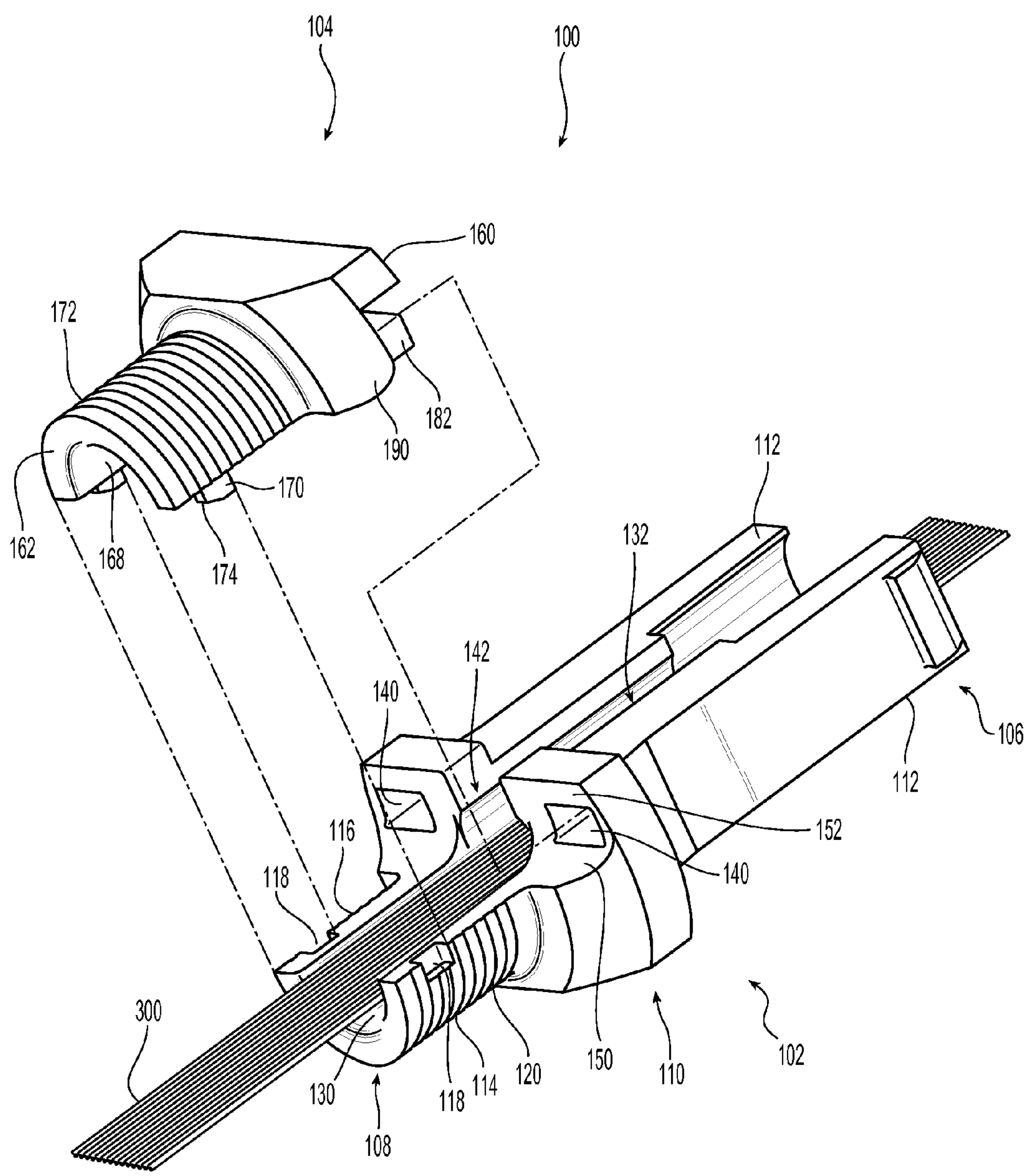
FIG. 1 is a side perspective view of one embodiment of a two-piece spring push according to the present invention with portions of optical fibers disposed therein.

Reference will now be made in detail to the present preferred embodiment(s) of the invention, examples of which are illustrated in the accompanying drawings. Whenever possible, the same reference numerals will be used throughout the drawings to refer to the same or like parts.

Referring to FIG. 1, a two-piece spring push 100 for use with a fiber optic connector is illustrated. The two-piece spring push 100 has a main body 102 and a cap 104 that frictionally connects to the main body 102. The main body 102 has a front end 106, a back end 108, and a middle portion 110. The front end 106 has two extensions 112 that, as is known in the art, engage the connector body in a fiber optic connector, particularly in the MT type connectors. The two extensions 112 keep a spring centrally located, the spring being used to bias the ferrule forward in the connector. The size and shape of the extensions 112 are not critical to the invention and may be shorter, longer, thicker, etc., and still fall within the scope of the present invention.

Figure 2:
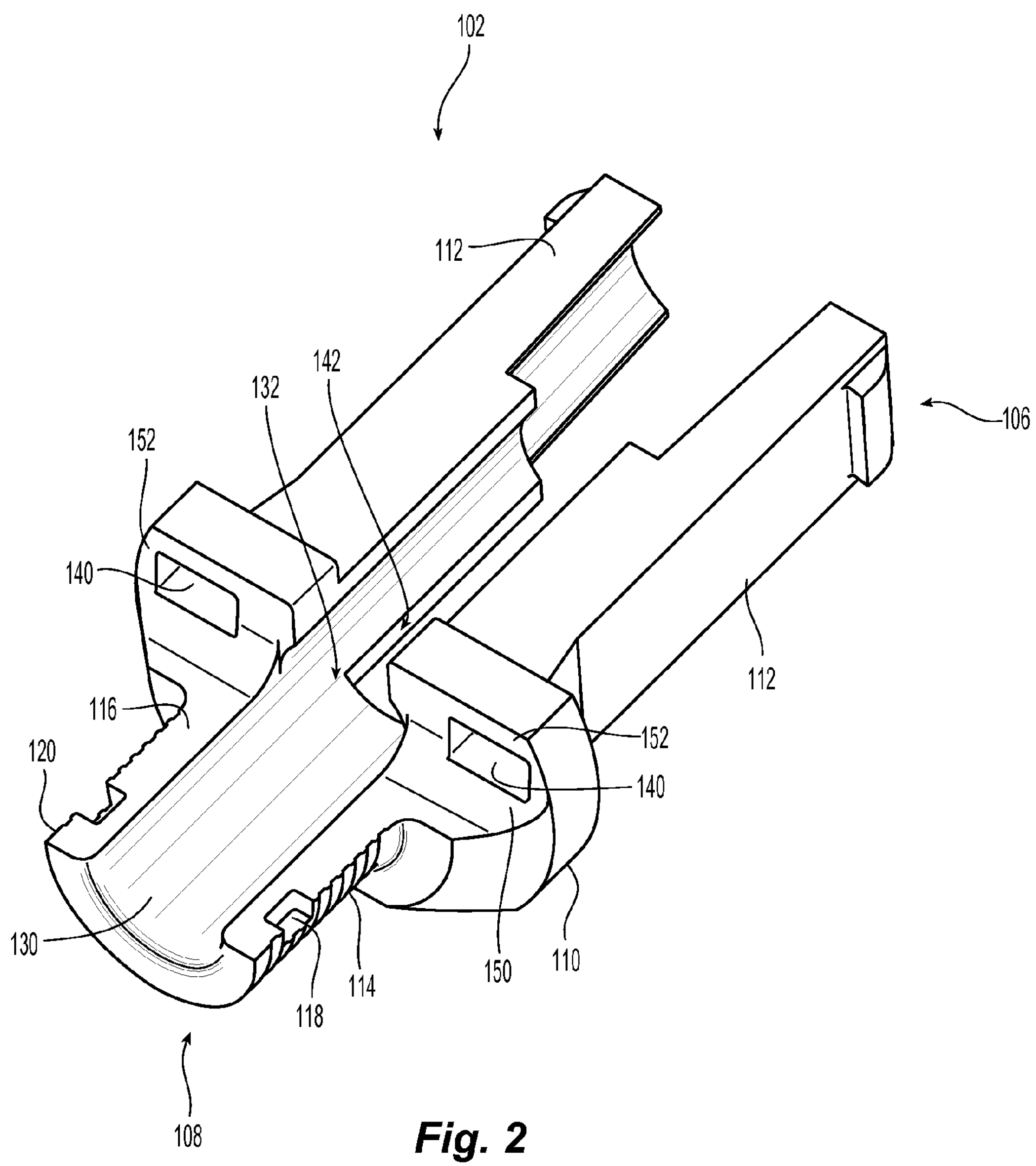
FIG. 2 is a top perspective view of a main body portion of two-piece spring push of FIG. 1.

As best illustrated in FIGS. 1 and 2, the back end 108 of the main body 112 is illustrated as a half cylinder 114. The half cylinder 114 has a flat upper surface 116, which, as described in more detail below, will mate with a corresponding surface on the cap 104. The half cylinder 114 also has two openings 118 extending downward and from the flat upper surface 116. The openings 118 are in communication with the outer surface 120 of the half cylinder, but they could be wholly contained within the half cylinder 114. The outer surface 120 of the back end 108 preferably has ridges or ribs 122 to assist in capturing the strength members (not shown) in the fiber optical cable used with the two-piece spring push 100. While the back end 108 is illustrated as being cylindrical, it could be of any shape and/or configuration and still fall within the scope of the present invention.

The back end 108 of the two-piece spring push 100 also has a groove 130 that extends through the back end 108 and, as noted below in more detail, preferably through the middle portion 110 as an opening 132. As can be seen in FIG. 1, the optical fibers 300 are to be disposed within the groove 130/opening 132 of the main body 102.

The middle portion 110 of main body 102 is preferably a shoulder that connects the back end 108 and the extensions 112 on the front end 106. The middle portion also functions as a stop for the two-piece spring push 100 when inserted into the fiber optic connector (not shown). The middle portion 110 has two openings 140 that extend into the middle portion 110 from the back end 108 to accept projections in the cap 104. The middle portion 110 also has an opening 142 that is in communication with the opening 132. As described in more detail below, the opening 142 functions as a locator for the cap 104 and also to assist in maintaining the structural integrity of the two-piece spring push 100.

It should be noted that there is a transitional area 150 between the back end 108 and the middle portion 110. The transitional area 150 is preferably a rounded area that transitions from the flat upper surface 116 to the rear facing surface 152 of the middle portion 110. The transitional area 150 assists in the mating of the cap 104 to the main body 102 as described below.

Figure 3:
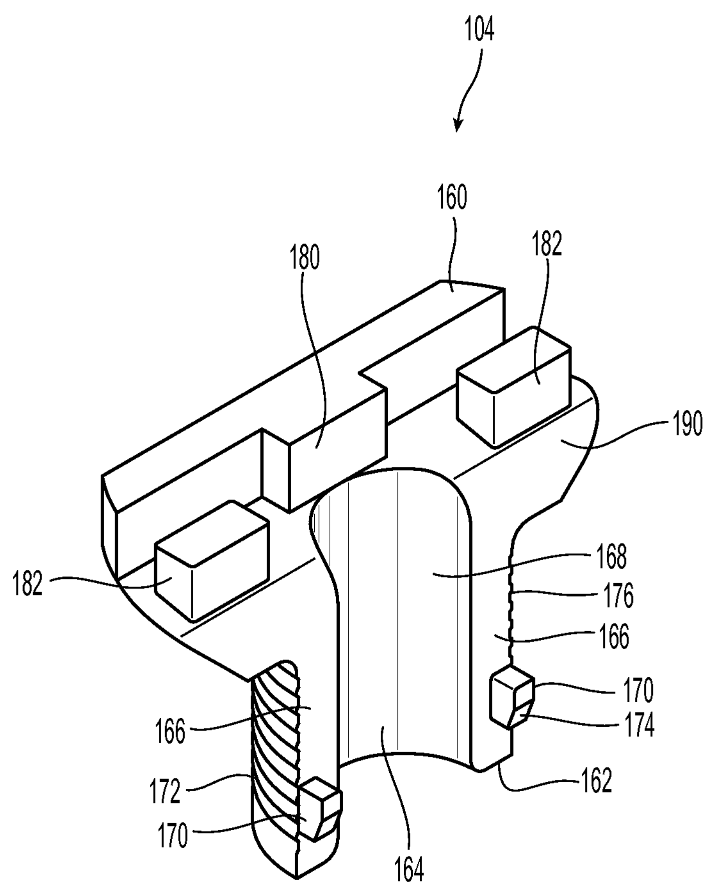
FIG. 3 is a front perspective view of a cap portion of the two-piece spring push of FIG. 1.
Figure 5:
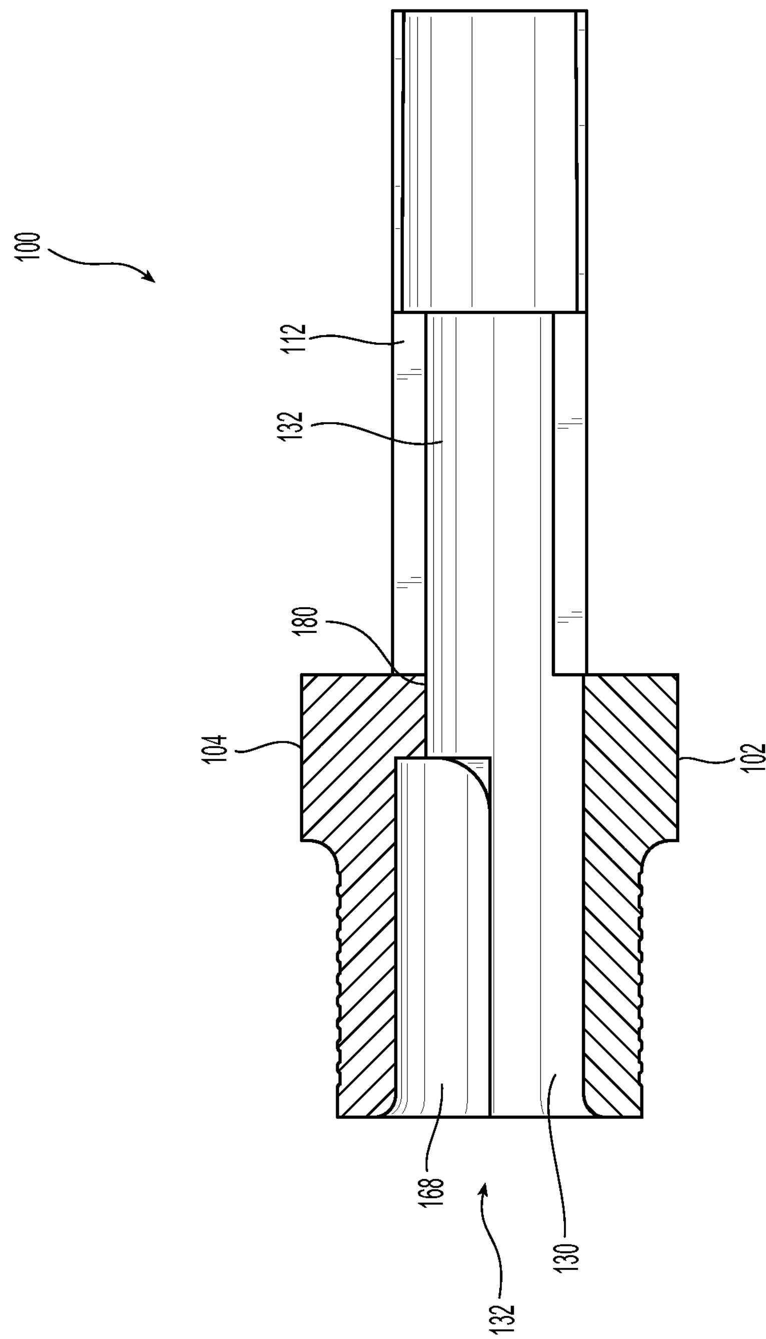
FIG. 5 is a cross section view of the two-piece spring push of FIG. 4 along the lines 5-5.

The cap 104 of two-piece spring push 100 is best illustrated in FIGS. 1 & 3. The cap 104 has a front end 160 and a back end 162. The back end 162 has a half cylinder 164. The half cylinder 164 has a flat lower surface 166 that mates with the flat upper surface 116 of the main body 102. The cap 104 also has a groove 168 that extends from the front end 160 to the back end 162. As noted above, the groove 168 aligns with the groove 130 to form the opening 132. See FIG. 5. The back end 162 also has two projections 170 extending downward and from the flat lower surface 166. The projections 170 are adjacent to the outer surface 172 of the half cylinder 164 and are aligned with the two openings 118. Thus, the projections 170 should be located on the cap 104 to correspond with the location of the two openings 118. The projections 170 have a chamfered portion 174, so that when the cap 104 is mated to the main body, the projections 170 can be inserted into the openings 118. The projections 170 could also have rounded surfaces rather than the flat, chamfered surfaces as illustrated.

The outer surface 172 of the back end 162 preferably has ridges or ribs 176 as did the back end 108 above.

The front end 160 of cap 104 terminates, as illustrated in FIG. 1, at the middle portion 110 of the main body 102. The front end 160 has a center projection 180 that extends downward from the front end 160 and aligns with the opening 142 and is in communication with the opening 132. The center projection 180 assists the user in aligning the cap 104 with the main body 102 during assembly.

The front end 160 of cap 104 also has two projections 182, which are to mate with the openings 140 in the middle portion 110 of the main body 102. It is preferable to have larger projections 182 and corresponding openings 140, illustrated as being larger than the projections 170 at the back ends 108,162, to prevent separation of the main body 102 from the cap 102 during side loads on the strain relief boot 304, particularly in the middle portion area. The direction of the projections 182 and corresponding openings 140 also helps in this regard. The cap 104 also has a transitional area 190, which corresponds to the transitional area 150 of the main body 102.

Figure 4:
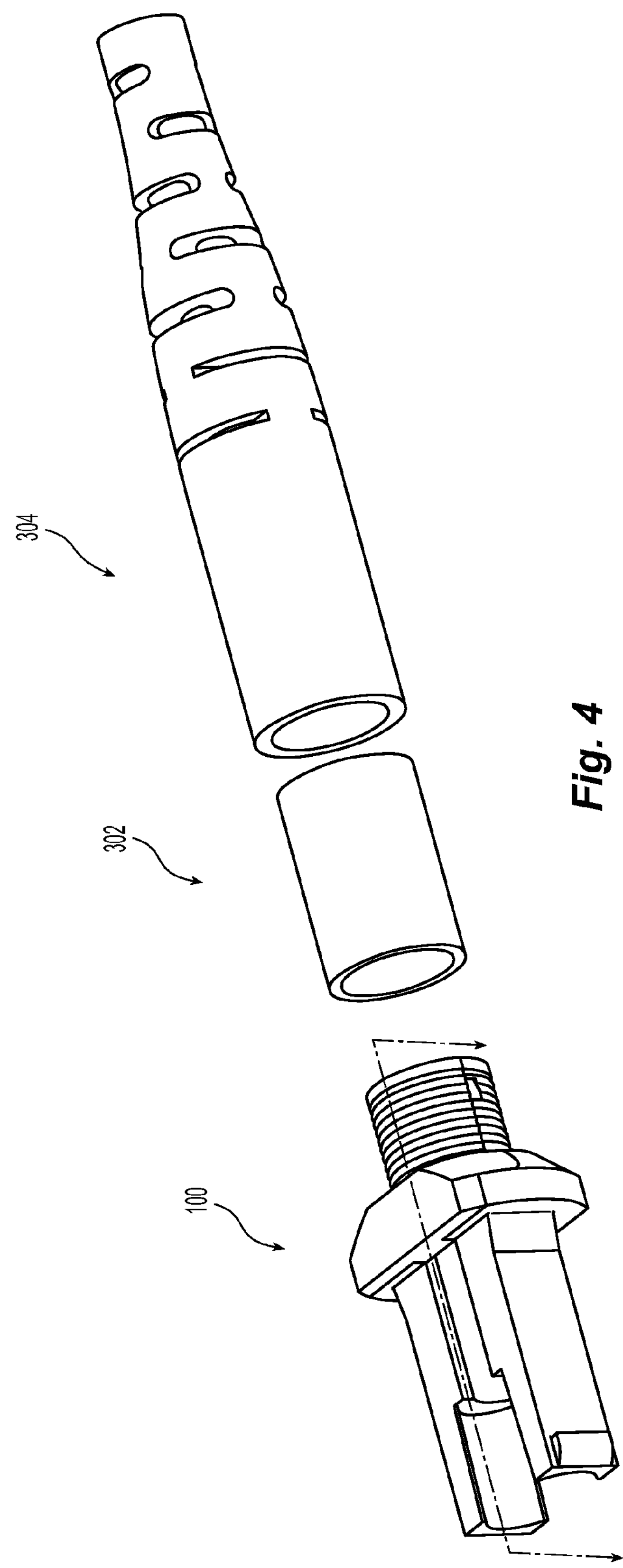
FIG. 4 is a perspective view of the two-piece spring push of FIG. 1 assembled and the crimp band and strain-relief boot to be used on an associated fiber optic connector.

As a user assembles the two-piece spring push 100, see FIG. 1, the main body 102 has the optical fibers 300 in the groove 130 with the optical ferrule secured to the optical fibers to the right in FIG. 1. The cap 104 is then aligned with the center projection 180 in the opening 142 and the projections 182 are inserted into the openings 140. The back end 162 of the cap 104 is then rotated downward thereby further inserting the projections 182 into the openings 140. At this point the transitional areas 150,190 allow the smooth rotation of the cap 104 relative to the main body 102. The projections 170 are then aligned with the openings 118, but as the back end 162 is rotated relative to the main body, the back portion of the projections 170 make contact with the edge of the openings 118. The user then snaps the back end 162 down and the chamfered portion 174 allows the projections to snap into the openings 118. The cap 104 is then held to the main body 102 through the frictional interactions of the projections and the openings. As illustrated in FIG. 4, a crimp band 302 and a strain relief boot 304 are then applied over the back end of the two-piece spring push 100, further securing the cap 104 to the main body 102.

Figure 6:
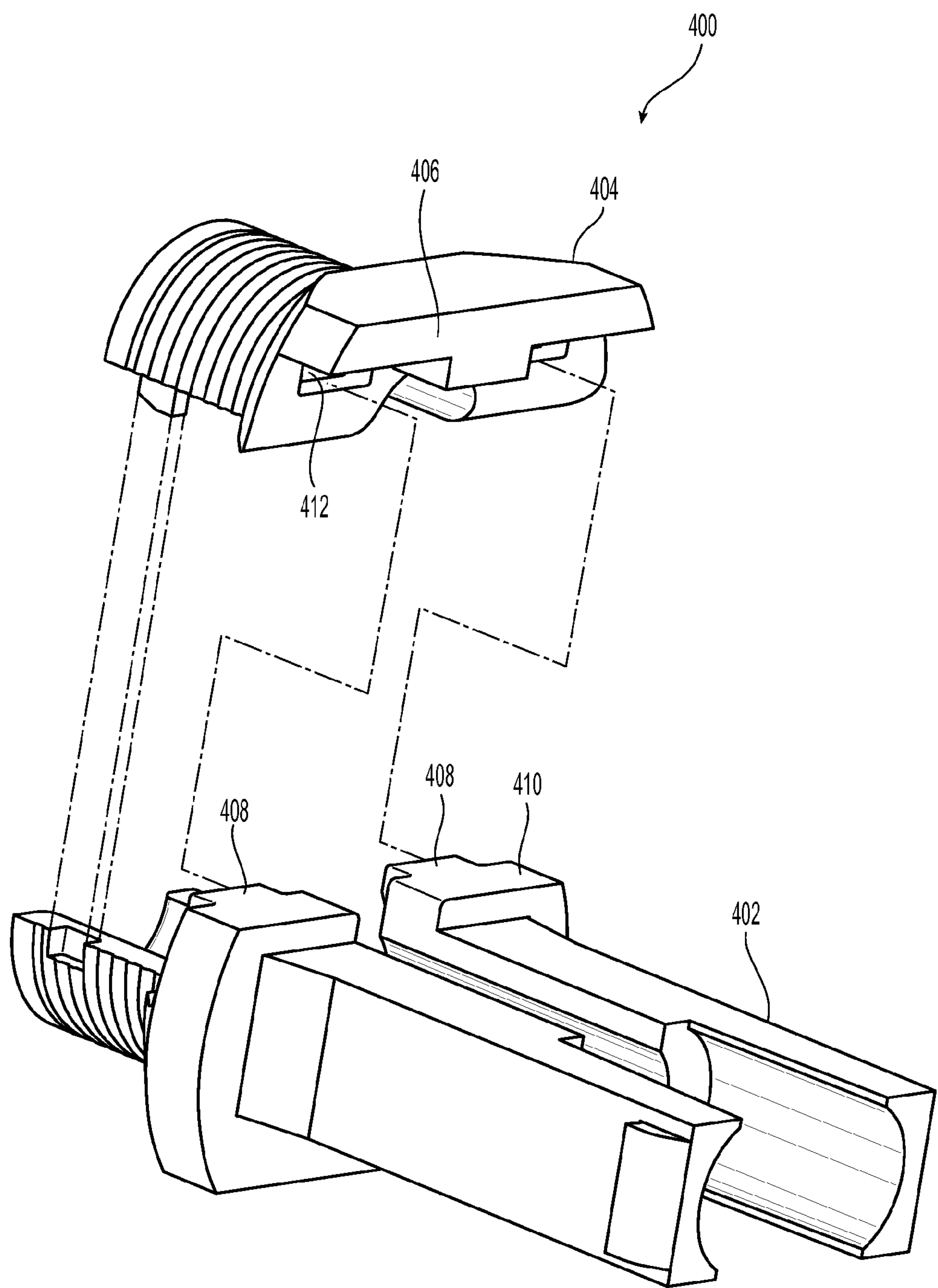
FIG. 6 is a perspective view of another embodiment of a two-piece spring push according to the present invention.

Another embodiment of a two-piece spring push 400 is illustrated in FIG. 6. In this embodiment, the two-piece spring push 400 has a main body 402 and a cap 404 that frictionally connects to the main body 402. The main body 402 and a cap 404 in this embodiment have two of the projections and two of the openings in opposing structures. The projections and openings at the front end 406 of the cap 404 are reversed. That is, the projections 408 are on the middle portion 410 of the main body 402 and the openings 412 are at the front end 406 of the cap 404. Similarly the projections and openings at the back end of the two-piece spring push 400 could also be reversed, although given the similarity in the back ends of the pieces of the two-piece spring push 400, the reversal is relatively simple.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A two-piece spring push for use with a fiber optic connector comprising:

a main body, the main body having a front end, a back end, and a middle portion disposed therebetween, the front end comprising two generally parallel extensions extending from the middle portion and having an opening therebetween, the back end forming at least a portion of a cylinder; and a cap configured to mate with the main body, the cap engaging at least a portion of the middle portion of the main body and at least a portion of the back end, the cap and the main body forming an opening through at least a portion of the spring push.

2. The two-piece spring push according to claim 1, wherein the cap and the main body together have a generally cylindrical outer surface at the back end of the main body.

3. The two-piece spring push according to claim 1, wherein the cap has at least two alignment features to align the cap with the main body.

4. The two-piece spring push according to claim 1, wherein the cap has five projections, the five projections corresponding to five openings on the main body, each of the five projections to be frictionally disposed within a corresponding one of the five openings on the main body to hold the cap to the main body.

5. The two-piece spring push according to claim 4, wherein one of the five openings on the main body is in the middle portion and in communication with the opening.

6. The two-piece spring push according to claim 4, wherein two of the five projections extend outwardly from the cap in a first direction and another two of the five projection extend outwardly from the cap in a second direction, the first direction being orthogonal to the second direction.

7. The two-piece spring push according to claim 1, wherein the opening extends from the back end and through the middle portion towards the front end and is in communication with the opening between the two generally parallel extensions.

8. The two-piece spring push according to claim 1, wherein the cap has three projections, the three projections corresponding to three openings on the main body, each of the three projections to be frictionally disposed within a corresponding one of the three openings on the main body to hold the cap to the main body.

9. The two-piece spring push according to claim 8, wherein the main body has two projections, the two projections corresponding to two openings on the cap, each of the two projections to be frictionally disposed within a corresponding one of the two openings on the cap to hold the cap to the main body.

10. A spring push for a fiber optic connector comprising:

a main body and a cap, the main body and cap secured to one another only by friction caused by mating the main body and cap, the main body having a front end, a back end, and a middle portion disposed therebetween and the cap having a front end terminating at the middle portion;

an opening formed by the mated main body and cap extending through at least a portion of the spring push; and a crimp body formed by the mating of the main body and cap at a back end thereof.

11. The two-piece spring push according to claim 10, wherein the crimp body has a generally cylindrical outer surface.

12. The two-piece spring push according to claim 10, wherein the cap has at least two alignment features to align the cap with the main body.

13. The two-piece spring push according to claim 10, wherein the cap has a least three projections, the at least three projections corresponding to at least three openings on the main body, each of the at least three projections to be frictionally disposed within a corresponding one of the at least three openings on the main body to hold the cap to the main body.

14. The two-piece spring push according to claim 13, wherein one of the at least three openings on the main body is in the middle portion and in communication with the opening.

15. The two-piece spring push according to claim 13, wherein two of the at least three projections extend outwardly from the cap in a first direction and another of the at least three projections extend outwardly from the cap in a second direction, the first direction being orthogonal to the second direction.

16. The two-piece spring push according to claim 10, wherein the opening extends from the back end and through the middle portion towards the front end.

17. A two-piece spring push for use with a fiber optic connector comprising:

a main body, the main body having a front end, a back end, and a middle portion disposed therebetween, the front end comprising two generally parallel extensions extending from the middle portion, the back end forming at least a portion of a cylinder; and a cap configured to mate with the main body, the cap having a front end terminating at the middle portion of the main body and engaging at least a portion of the middle portion of the main body and at least a portion of the back end, the cap and the main body forming an opening through at least a portion of the spring push.

18. The two-piece spring push according to claim 1, wherein the opening between the two generally parallel extensions and the opening formed by the cap and the main body are in communication with one another.

* * * * *